United States Patent
Bearer et al.

(10) Patent No.: US 7,635,113 B2
(45) Date of Patent: Dec. 22, 2009

(54) BALL VALVE SEAT ARRANGEMENT

(75) Inventors: Mark D. Bearer, Akron, OH (US); David Hasak, Concord, OH (US); Eric Kvarda, Mentor, OH (US)

(73) Assignee: Swagelok Company, Solon, OH (US)

( * ) Notice: Subject to any disclaimer, the term of this patent is extended or adjusted under 35 U.S.C. 154(b) by 51 days.

(21) Appl. No.: 11/181,523

(22) Filed: Jul. 14, 2005

(65) Prior Publication Data

US 2006/0017035 A1  Jan. 26, 2006

Related U.S. Application Data

(60) Provisional application No. 60/588,127, filed on Jul. 15, 2004.

(51) Int. Cl.
*F16K 25/00* (2006.01)

(52) U.S. Cl. .................. 251/181; 251/174; 251/314

(58) Field of Classification Search .............. 251/174, 251/176, 180, 181, 175, 315, 315.01, 314, 251/316

See application file for complete search history.

(56) References Cited

U.S. PATENT DOCUMENTS

| | | | | |
|---|---|---|---|---|
| 2,548,128 | A | * | 4/1951 | Snyder .................. 251/174 |
| 2,882,009 | A | | 4/1959 | Bryant |
| 3,266,769 | A | * | 8/1966 | Shand .................. 251/172 |
| 3,269,695 | A | | 8/1966 | Grove |
| 3,387,815 | A | * | 6/1968 | Richards .................. 251/174 |
| 3,401,915 | A | | 9/1968 | Kim |
| 3,460,802 | A | * | 8/1969 | Colby et al. .................. 251/172 |
| 3,656,498 | A | | 4/1972 | Grove et al. |
| 3,667,727 | A | * | 6/1972 | Bowden .................. 251/172 |
| 3,719,344 | A | | 3/1973 | Jones et al. |
| 3,721,425 | A | * | 3/1973 | Jones et al. .................. 251/174 |
| 4,111,393 | A | | 9/1978 | McClurg et al. |
| 4,113,229 | A | * | 9/1978 | Fujiwara .................. 251/174 |
| 4,284,262 | A | * | 8/1981 | Ruyak .................. 251/65 |
| 4,410,165 | A | | 10/1983 | Koch et al. |
| 4,428,561 | A | * | 1/1984 | Thompson .................. 251/174 |
| 4,467,823 | A | | 8/1984 | Shaffer et al. |
| 4,483,511 | A | | 11/1984 | Kushida et al. |
| 4,557,286 | A | | 12/1985 | Nagano |
| 4,572,239 | A | * | 2/1986 | Koch et al. .................. 251/172 |

(Continued)

FOREIGN PATENT DOCUMENTS

CN      2490375      5/2002

(Continued)

OTHER PUBLICATIONS

Brochure, "Ball Valves General Purpose and Special Application", Swagelok Company, printed USA, Apr. 2004, 24 pgs.

(Continued)

*Primary Examiner*—John K Fristoe, Jr.
(74) *Attorney, Agent, or Firm*—Calfee, Halter & Griswold LLP (57) ABSTRACT

Ball valves that include a gland that is interposed between a spring and a seat. The ball valves include a valve body, a ball, a valve seat, and an annular spring. The spring urges the gland member toward the valve seat to urge the valve seat toward the ball.

19 Claims, 6 Drawing Sheets

U.S. PATENT DOCUMENTS

| | | | |
|---|---|---|---|
| 4,602,762 A | | 7/1986 | Koch et al. |
| 4,815,701 A | * | 3/1989 | Stone .......................... 251/174 |
| 4,911,413 A | * | 3/1990 | Baba et al. .................. 251/181 |
| 4,953,587 A | * | 9/1990 | Steele ......................... 251/174 |
| 5,052,657 A | * | 10/1991 | Winship ...................... 251/160 |
| 5,163,655 A | | 11/1992 | Chickering, III et al. |
| 6,695,285 B1 | | 2/2004 | Hotton et al. |

FOREIGN PATENT DOCUMENTS

| | | |
|---|---|---|
| CN | 2597788 | 1/2004 |
| DE | 4017819 A1 | 1/1991 |
| DE | 100 58 530 A1 | 5/2002 |
| JP | 11-304014 | 11/1999 |
| JP | 11-344135 | 12/1999 |

OTHER PUBLICATIONS

International Search Report from PCT/US2005/024995, 3 pgs.

Office action from Chinese Application No. 200580030259.X issued Sep. 5, 2008.

\* cited by examiner

BALL VALVE SEAT ARRANGEMENT

RELATED APPLICATIONS

This application claims priority from U.S. provisional application Ser. No. 60/588,127, titled "Ball Valve Seat Seal," filed on Jul. 15, 2004. U.S. provisional application Ser. No. 60/588,127 is incorporated herein by reference in its entirety.

TECHNICAL FIELD

The present invention relates to ball valves and, more particularly, to ball valve seat configurations.

BACKGROUND OF THE INVENTION

Ball valves are well known. One design that has met with substantial commercial success is the 60 Series ball valve manufactured and sold by Swagelok Company and are described in U.S. Pat. No. 4,410,165 (hereinafter the "'165 patent") and U.S. Pat. No. 4,602,762, the entire disclosures of which are fully incorporated herein by reference. This ball valve design is characterized by a number of features that improve the seal performance and cycle life of the valve. The valve includes a pair of seat assemblies each on an opposite side of the ball member. Each seat assembly includes a flexible seat ring, a support ring and a disc spring. The disc spring urges the seat ring into sealing engagement with an outer surface of the ball, and the support ring reduces inward axial displacement and deforming of the seat ring when the valve is under pressure. A significant feature of the ball valve is that the ball and seats are "floating" so that the ball can shift axially under pressure. The floating ball design avoids the need for trunnion style mounting or other costly alternatives.

Other ball valve designs are shown in U.S. Pat. Nos. 6,695,285 and 5,163,655.

SUMMARY

The present application relates to ball valves that include a gland that is interposed between a spring and a seat. One such ball valve includes a valve body, a ball, a valve seat, and a disc spring. The valve body includes a valve chamber, an inlet passage, and an outlet passage. The ball is mounted in the chamber such that the valve is moveable along an axis of the valve chamber and such that that the ball is rotateable in the valve chamber between valve open and closed positions. The valve seat is disposed in the valve body in sealing engagement with the ball such that the valve seat is moved along the axis when the ball is moved. The gland member is disposed in the valve body in engagement with the valve seat such that the gland member is moved along the axis when the ball is moved. The spring is disposed in the valve body in engagement with the gland member. The spring urges the gland member toward the valve seat to urge the valve seat toward the ball.

In operation, the spring applies a biasing force to the gland. The ball valve housing guides movement of the gland. The biasing force is transferred from the gland to the seat. The housing guides movement of the seat to maintain engagement between the seat and the ball.

Further advantages and benefits will become apparent to those skilled in the art after considering the following description and appended claims in conjunction with the accompanying drawings.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE INVENTION

FIGS. 1-4 illustrate a ball valve 10 in accordance with one embodiment of the invention. The invention is applicable to ball valves of varying constructions, and thus the invention is not limited to use with a ball valve of the specific type that is described herein.

The ball valve 10 (FIG. 1) includes a valve body 12 that defines a valve chamber 14 that communicates with the exterior of the valve 10, such as by cylindrical inlet and outlet passages 16 and 18 centered on an axis 19.

Figure 4:
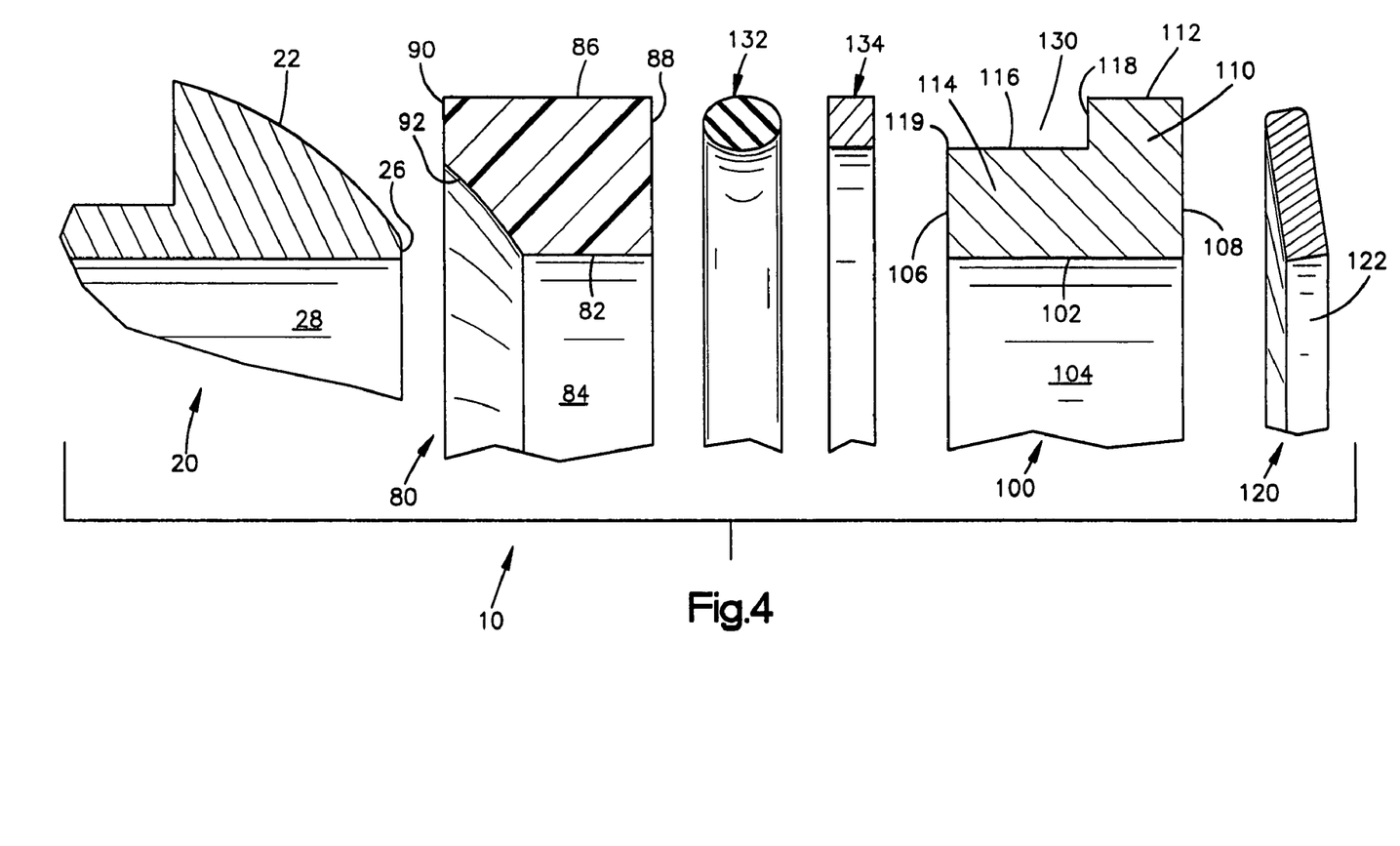
FIG. 4 is an enlarged exploded view of parts of the valve of FIG. 1.

The valve 10 includes a ball 20 mounted in the valve chamber 14. The ball 20 may have a spherical main surface 22 and opposite planar end surfaces 26 (FIG. 4). A fluid flow passage 28 (FIG. 2) extends through the ball 20 between the end surfaces 26.

The valve 10 includes an actuator 30. The actuator 30 can be of any suitable type, such as manual (lever, for example), electric, pneumatic, etc. The actuator 30 has a stem portion 32 that is coupled to the ball 20. The actuator 30 in this embodiment has a handle or projecting portion 34 that is engageable to receive actuating force for the valve 10.

Figure 2:
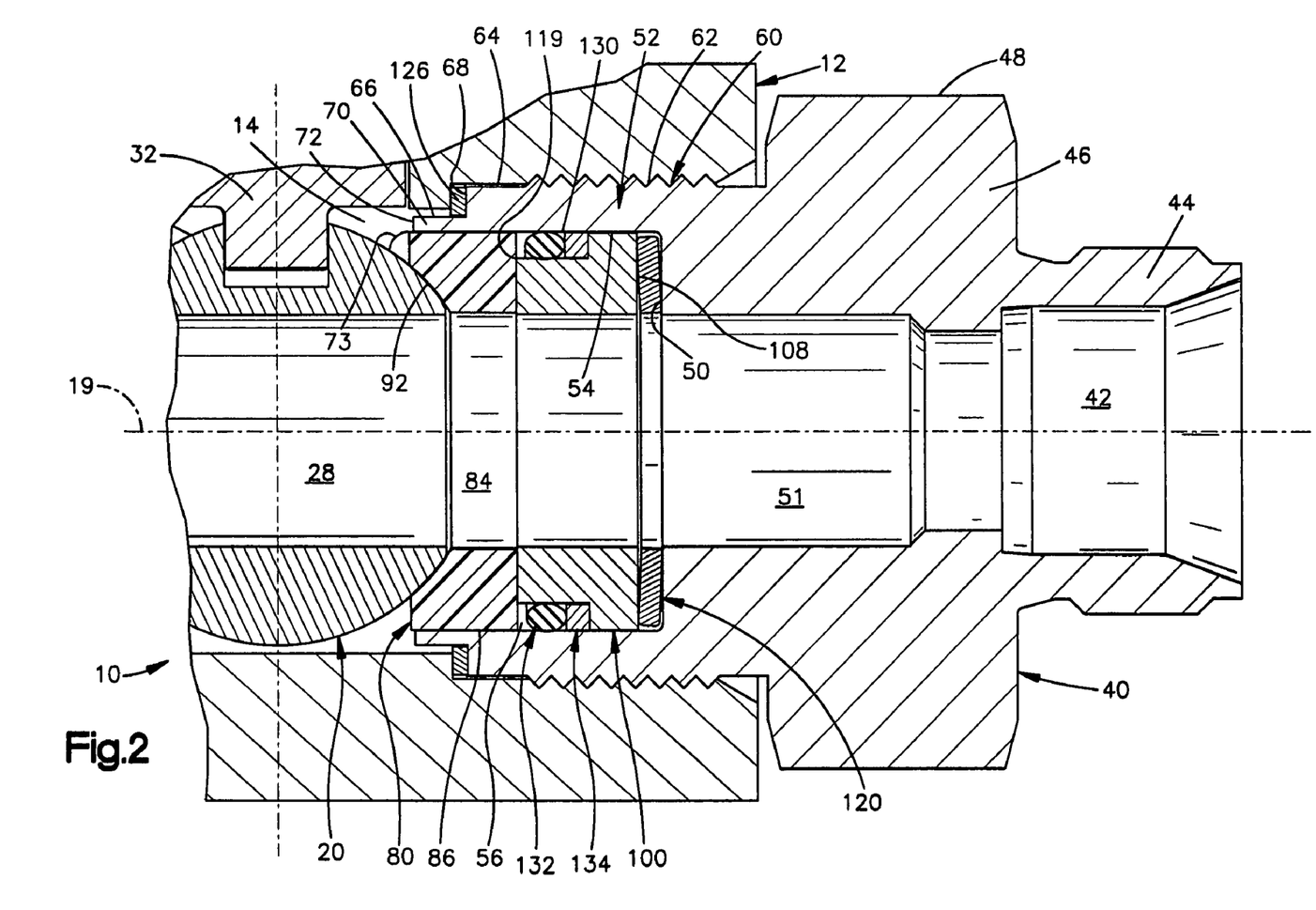
FIG. 2 is an enlarged view of a portion of the ball valve of FIG. 1, showing the valve in an open condition.
Figure 3:
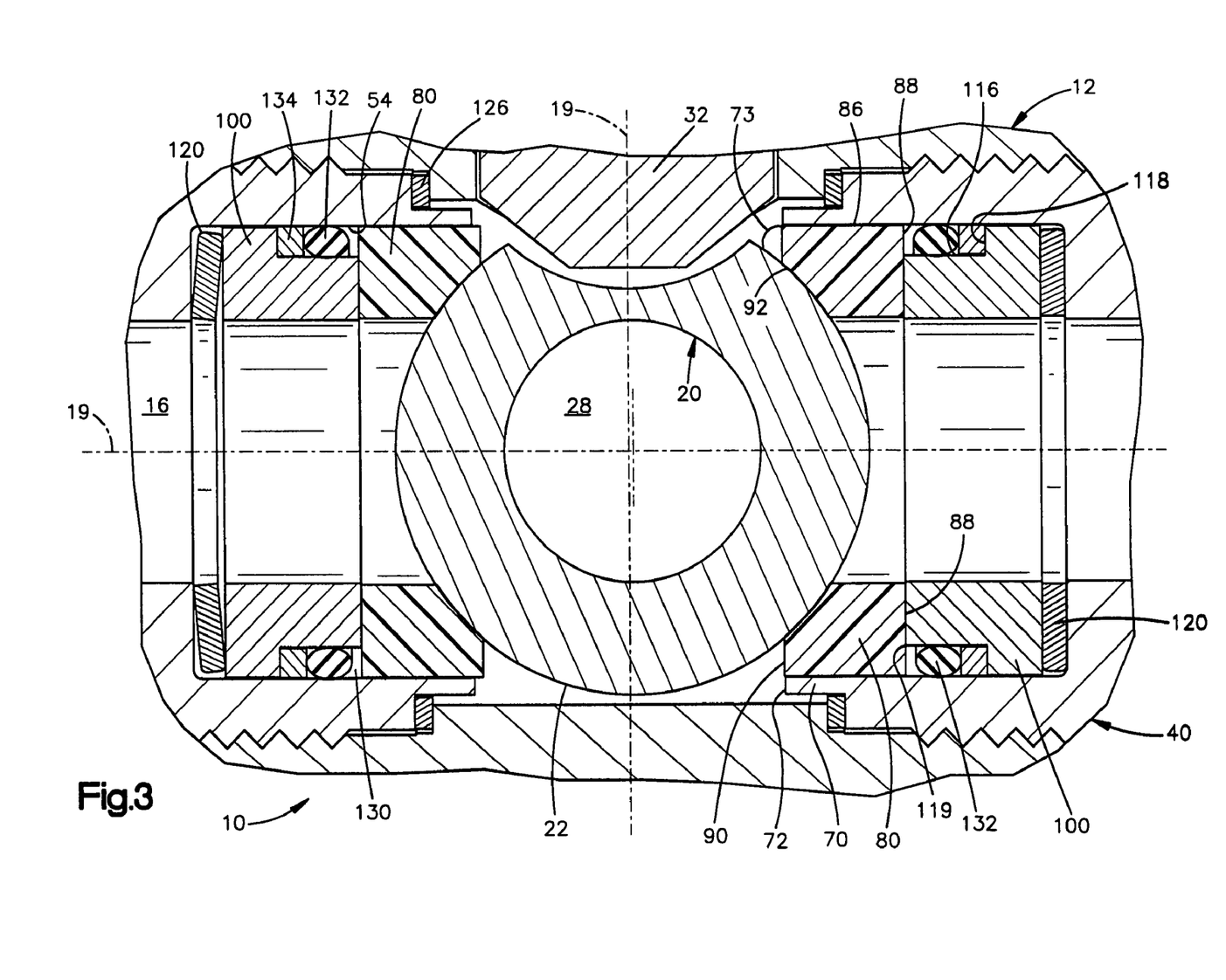
FIG. 3 is a further enlarged view of a portion of the ball valve of FIG. 1, showing the valve in a closed condition.

Rotational force applied to the actuator projecting portion 34 causes the stem portion 32 to rotate the ball 20 in the valve body 12 between an open condition (FIGS. 1 and 2) and a closed condition (FIG. 3). When the valve 10 is in the open condition, the fluid flow passage 28 in the ball 20 aligns with the inlet and outlet passages 16 and 18 in the valve body 12 to permit fluid flow through the valve. When the valve 10 is in the closed condition, the ball 20 blocks fluid flow between the inlet and outlet passages 16 and 18.

The valve 10 may include connectors such as two end screws that may be, but need not be identical to each other, an inlet end screw 38 and an outlet end screw 40. The inlet end screw 38 is screwed into the inlet passage 16 of the valve body 12, and the outlet end screw 40 is screwed into the outlet passage 18 of the valve body. Because the inlet end screw 38 and the outlet end screw 40 may be identical to each other as the valve 10 is bi-directional, only the outlet end screw 40 is described in detail herein. In addition, the two seat assemblies in the valve 10 (one of which is described below) are identical and so only the downstream (or outlet end) seat assembly is described. The terms "inlet" and "outlet" as well as the terms "upstream" and "downstream" are used only for convenience of reference to the drawings. Either end of the valve 10 can be the inlet or the outlet since the valve is bidirectional.

The outlet end screw 40 may have an overall tubular configuration with a cylindrical fluid flow passage 42. The end screw 40 has a first or outer portion 44 that forms part of a tube fitting or other connection with a pipe or tube or other flow component (not shown) of the fluid system in which the value 10 is incorporated. The end screw portion 40 can be configured in many different manners to enable different types of fluid connection of the valve 10 into the fluid system.

The end screw 40 has a second portion 46 axially inward of the first portion 44. The second portion 46 is relatively thick walled and has wrenching flats 48 on its outside. The second portion 46 terminates in an annular, radially extending inner end surface 50 that faces axially inward toward the valve chamber 14. The end screw 40 defines a fluid flow passage 51 which, as it extends through the second portion 46 of the end screw 40, is of about the same diameter as the fluid flow passage 28 in the ball 20.

The end screw portion 40 has a generally tubular third portion 52 that extends axially inward from the second portion 46. As described below, the third portion 52 of the end screw 40 has a thinner wall than the second portion 46 and is therefore larger in internal diameter.

The third portion 52 of the end screw 40 has a cylindrical inner surface, or seal surface 54 centered on the axis 19. The diameter of the seal surface 54 is larger than the diameter of the fluid flow passage 51 in the second portion 46 of the end screw 40. The axially extending seal surface 54, and the radially extending inner surface 50, together define a cylindrical seal chamber 56 in the end screw 40.

The third portion 52 of the end screw 40 has a stepped outer surface 60 with three distinct parts. An axially outermost section 62 of the outer surface 60 has a threaded configuration and is adapted to be screwed into the inlet passage portion of the valve body 12 to attach the end screw 40 to the valve body. An axially central section 64 of the outer surface 60 has a smooth cylindrical configuration and is adapted to be closely fitted within the valve body 12. The smooth section 64 is smaller in diameter than the threaded section 62.

An axially innermost section 66 of the outer surface 60 is smaller in diameter than the second section 64 and has a smooth cylindrical configuration. An annular shoulder surface 68 extends radially between the second and third sections 64 and 66 of the outer surface 60. Because the innermost section 66 of the outer surface 60 of the third portion 52 of the end screw 40 is smaller in diameter than the second section 64, the third portion of the end screw has a thin walled configuration at this location, forming a sleeve 70 at the innermost portion of the end screw. The sleeve 70 carries a radially extending terminal end surface 72 of the end screw 40. A gap 73 is defined between the end surface 72 of the end screw 40 and the outer surface 22 of the ball 20.

The valve 10 includes a seat 80. The seat 80 is preferably made from a material that does not plastically deform at the operating conditions or pressure and temperature experienced by the valve 10. One suitable material is PEEK. At high temperatures PEEK retains its hardness, as is desirable for the relatively high temperatures experienced in a vehicular environment, such as an Alternative Fuel Vehicle (natural gas or hydrogen) environment. The invention however is not limited in its use to alternative fuel vehicles.

The seat 80 has a ring-like configuration extending around the axis 19 and has thus a cylindrical inner surface 82 defining a central opening 84 for fluid flow. The central opening 84 may be the same diameter as the fluid flow passage 28 in the ball 20.

The seat 80 also has a cylindrical outer surface 86 that coaxial with the inner surface 82. The diameter of the outer surface 86 may be substantially the same as the diameter of the inner seal surface 54 of the end screw 40. In an exemplary embodiment, the diameter of the outer surface 86 is slightly smaller than the inner seal surface 54 of the end screw to ease axial movement of the seat in the end screw.

The seat 80 has an annular, radially extending, axially outer end face 88. The seat 80 also has an annular, radially extending, axially inner end face 90 that may extend parallel to the outer end face 88. A seal surface 92 of the seat 80 extends between the inner end face 90 and the inner surface 82. The seal surface 92 may have a spherical configuration adapted to abuttingly engage the spherical surface 22 of the ball 20.

The valve 10 also includes a gland 100. The gland 100 is a relatively rigid member that supports the seat 80 and also has other functions as described below.

Referring to FIG. 4, the gland 100 in the illustrated embodiment may be a ring-shaped member having a cylindrical, axially extending inner side surface 102 centered on the axis 19. The inner side surface 102 defines a central opening 104 through which fluid can flow. The central opening 104 may be about the same diameter as the central opening 84 in the seat 80 of the illustrated example. The gland 100 also has parallel, annular, axially inner and outer end faces 106 and 108.

A larger diameter axially outer portion 110 of the gland 100 has a cylindrical outer major surface 112 that is the same diameter as the seal surface 54 of the end screw 40. In an exemplary embodiment, the diameter of the axially outer portion 110 is slightly smaller than the inner seal surface 54 of the end screw to ease axial movement of the gland 100 in the end screw.

An axially inner portion 114 of the gland 100 is smaller in diameter than the outer portion 110 and has a cylindrical outer seal surface 116. An annular shoulder surface 118 extends radially between the outer major surface 112 and the outer seal surface 116 of the gland 100. The gland 100 has a corner, or edge 119 at the intersection of the inner end face 106 and cylindrical surface 116.

The valve 10 includes a spring 120 or other mechanism for applying force to the seat 80 to maintain a seal against the ball 20. In the illustrated embodiment, the spring 120 is a disc spring, or Belleville washer. The spring 120 may have an annular configuration with a central opening 122. The spring 120 may have a rectangular cross-sectional configuration.

Figure 1:
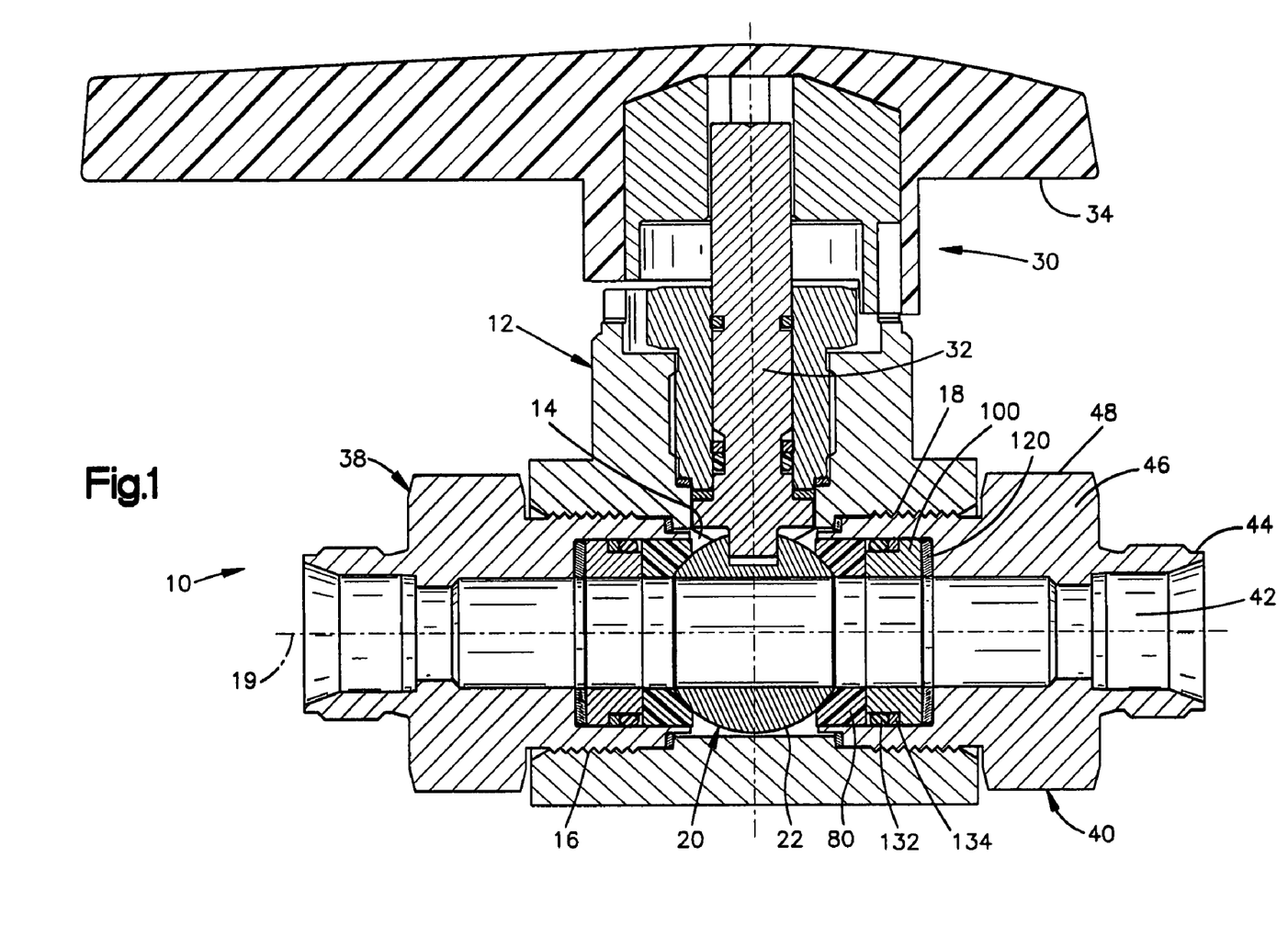
FIG. 1 is a sectional view of a ball valve in accordance with one embodiment of the invention.

When the valve 10 is assembled as shown in FIGS. 1-3, the external thread 62 on the end screw 40 is in engagement with an internal thread on the outlet passage 18. A body seal such as a gasket 126 is located between the shoulder surface 68 of the end screw 40, and a shoulder surface on the valve body 12. The gasket 126 seals between the end screw 40 and the valve body 12. Other body seal arrangements may be used as required.

The spring 120, the gland 100, and the seat 80 are located in the seal chamber 56 of the end screw 40. The spring 120 is disposed between the inner end surface 50 of the end screw 40, and the outer end face 108 of the gland 100. The spring 120 exerts a biasing force to urge the gland 100 in a direction away from the inner end surface 50 of the end screw 40. The gland 100 transfers the biasing force to the seat to press the seat into engagement with the ball 20.

The seat 80 is disposed axially inward of the gland 100 in the seal chamber, between the gland and the ball 20. In the illustrated example, the seat is not contained in the gland 100.

The seat 80 abuts the gland and the cylindrical outer side surface 86 of the seat 100 engages the inner seal surface 54 of the end screw 40.

The gland 100 transmits the biasing force of the spring 120 into the seat 80. This force urges the seat 80 into engagement with the ball 20. The seal surface 92 of the seat 80 is urged into abutting engagement with the spherical surface 22 of the ball 20.

When the parts of the valve 10 are assembled, a seal groove 130 is defined in the valve 10. The seal groove 130 has a rectangular cross-sectional configuration. The shoulder surface 118 and the seal surface 116 of the gland 100 define two sides of the seal groove 130. The outer end face 88 of the seat 80, and the inner seal surface 54 of the end screw 40, define the other two sides of the seal groove 130.

A seal 132 is disposed in the seal groove 130. In the illustrated example, the seal 132 is thus not radially outward of any portion of the seat 80. In the illustrated embodiment the seal 132 is an O-ring, although other types of seals may be used. The seal 132 is in engagement with the outer seal surface 116 of the gland 100. A back up ring 134 is also disposed in the seal groove 130, axially outward of the seal. The back up ring 134 helps to locate the O-ring 132 and to prevent excessive deformation of the O-ring. The seal 132 seals between the inner seal surface 54 of the end screw 40, and the gland 100.

The length of the inner end portion 52 of the end screw 40 is selected so that when the end screw 40 is screwed into the valve body 12, the terminal end surface 72 is located axially inward of the end surface 26 of the ball 20. The curved surface of the ball extends into the end of the end screw and is isolated from the screw by the seat. The terminal end surface 72 defines the axially inner end of the seal chamber 56 in the end screw 40. The terminal end surface 72 of the end screw is adjacent to the inner end face 90 of the seat 80.

When the valve 10 is in the open condition as shown in FIGS. 1 and 2, the fluid that flows into the valve from the inlet end screw 38 flows through the passage in the ball 20 and out of the valve through the outlet end screw 40. There is a relatively low amount of force acting on the ball 20 to move the ball in the downstream direction.

However, when the valve 10 is in the closed condition, the force of the fluid upstream of the valve is directed against the ball 20. Because the ball is a "floating" ball, this force tends to move the ball 20 a small distance downstream in the valve body 12, as is illustrated in FIG. 3 (the distance may be exaggerated in FIG. 3). The movement of the ball 20 forces the seat 80 and the gland 100 to move closer to the inner end face 50 of the second portion 46 of the end screw 40, compressing the spring 120.

When the spring 120 is compressed, the inner end face 90 of the seat 80 is about even with, or is axially outward of, the inner terminal end surface 72 of the end screw 46. The gap 73 between the end surface 72 and the ball surface 22 is relatively small. The inner end portion 52 of the end screw 40 supports the seal 80 by helping to prevent the seal from deforming or extruding radially outward under the force exerted by the ball 20. The relatively small size of the gap 73 helps to minimize any deformation or extrusion of the seal 80, into the valve chamber 14, under the force exerted by the ball 20.

Figure 5:
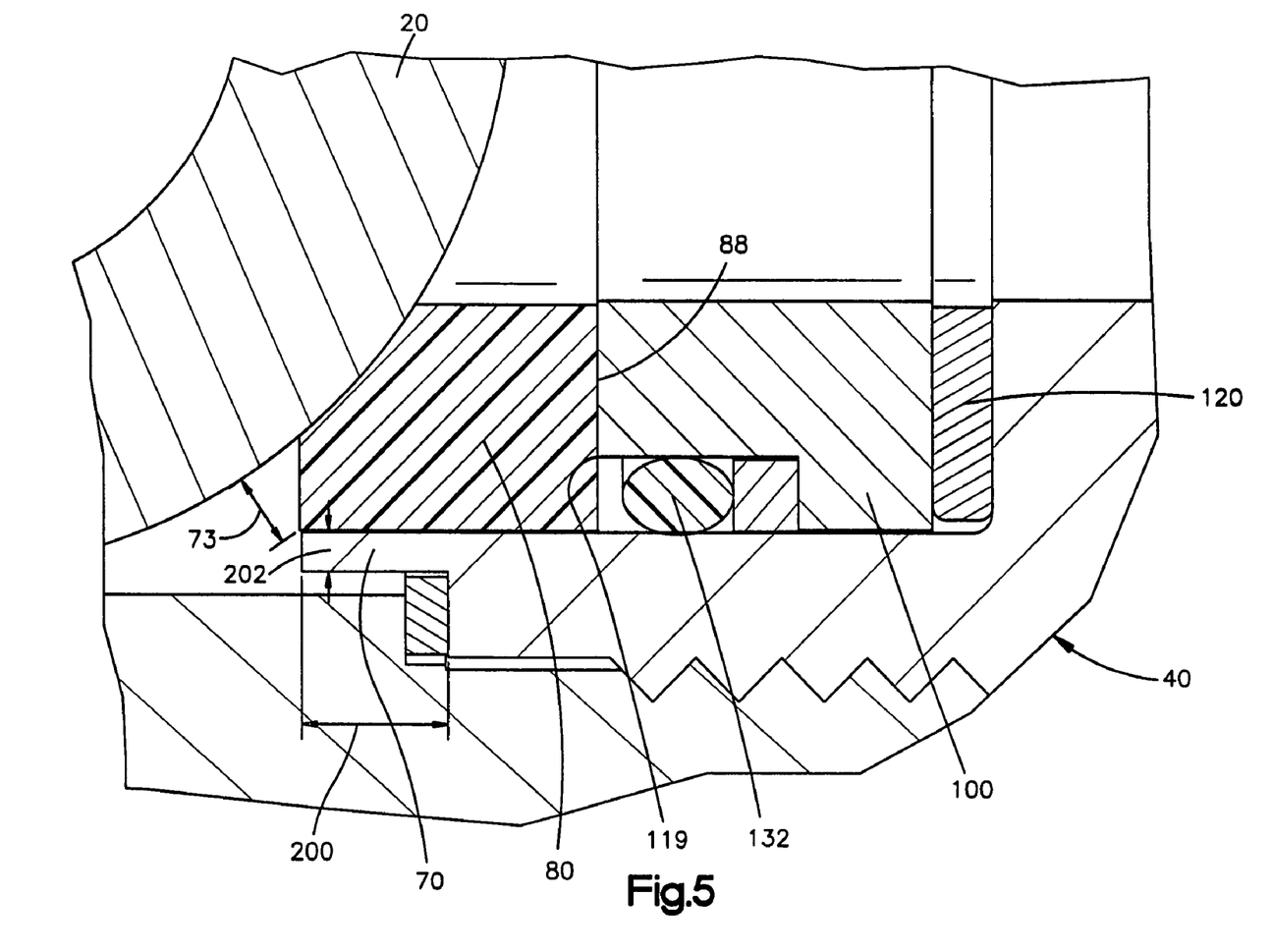
FIG. 5 is a further enlarged view of a portion of the ball valve of FIG. 1, showing the valve in a closed position.

Referring to FIG. 5, one example of a valve defines a gap 73 that is between 0.050 and 0.070 inches and may be a bout 0.062 inches. In this example, the ball 20 has a diameter between 0.750 and 1.000 inch and may be about 0.870 inches in diameter. In this example, the collar 70 has a height 200 between 0.050 and 0.150 inches and may be about 0.110 inches. In this example, the collar 70 has a width 202 between 0.015 and 0.045 inches and may have a width of approximately 0.0285 inches.

When the valve 10 is assembled, the edge 119 (FIG. 4) of the gland 100, adjacent to the seal groove 130, is pressed by the biasing force of the spring 120 against the end surface 88 of the seat 80. The edge 119 may stabilize the seat by slightly biting or digging into the seat. The engagement of this edge 119 with the seat 80 helps to resist pressure on the outer diameter of the seat and block radially inward movement of the material of the seat. In addition, the engagement of this edge 119 with the seat 80 helps to seal between the gland 100 and the seat 80.

During movement of the ball 20 in response to pressure changes, the entire assembly of the seat 80, gland 100, and seal 132 slides with the ball. This allows the ball 20 to float easily while maintaining a high quality seal between the ball and the valve body 12.

The spring 120 changes shape as it compresses and extends. It also has corners or edges that move against the parts it acts against. The engagement of the spring 120 with the gland 100 rather than the seat 80, eliminates any wear of the seat caused by rubbing of the spring. Thus, the gland transfers the force of the spring to the seat, while providing a contact barrier between the spring and the seat, to help prolong the life of the seat 80. In addition, the gland supports the seal against the valve body or end screw.

The gland 100 does not engage the ball 20. All the engagement with the ball, and all the sealing effect against the ball, is by the seat 80. As a result, there is no metal to metal contact with the ball 20, which eliminates abrasion, galling or wear of the metal gland and ball.

Because the spring 120 is present in the valve 10, the seat 80 is a "live loaded" seat, which can last longer because it moves with the ball 20 and does not undergo significant deformation every time the ball moves. The spring 120 allows compensation for seat wear through much of the range of spring stroke.

Because the spring 120 is located between the metal end screw 40 and the metal gland 100, the spring is reversible without affecting its operation. Therefore, the spring 120 can be assembled into the valve 10 facing in either direction. This feature can help to reduce complexity and cost of assembly of the valve 10.

The example of a ball valve 10 illustrated by FIGS. 1-5 has a metal gland that is interposed between a metal spring and a plastic seat, to enhance longevity of the seat. The seat is not contained within the gland but rather is in an abutting relationship with the gland. A corner of the gland bites into the seat to help to stabilize the seat. A sleeve that is part of the end screw prevents extrusion of the material of the seat into a gap between the ball and the end screw. A spring for loading the seat is reversible.

Figure 6:
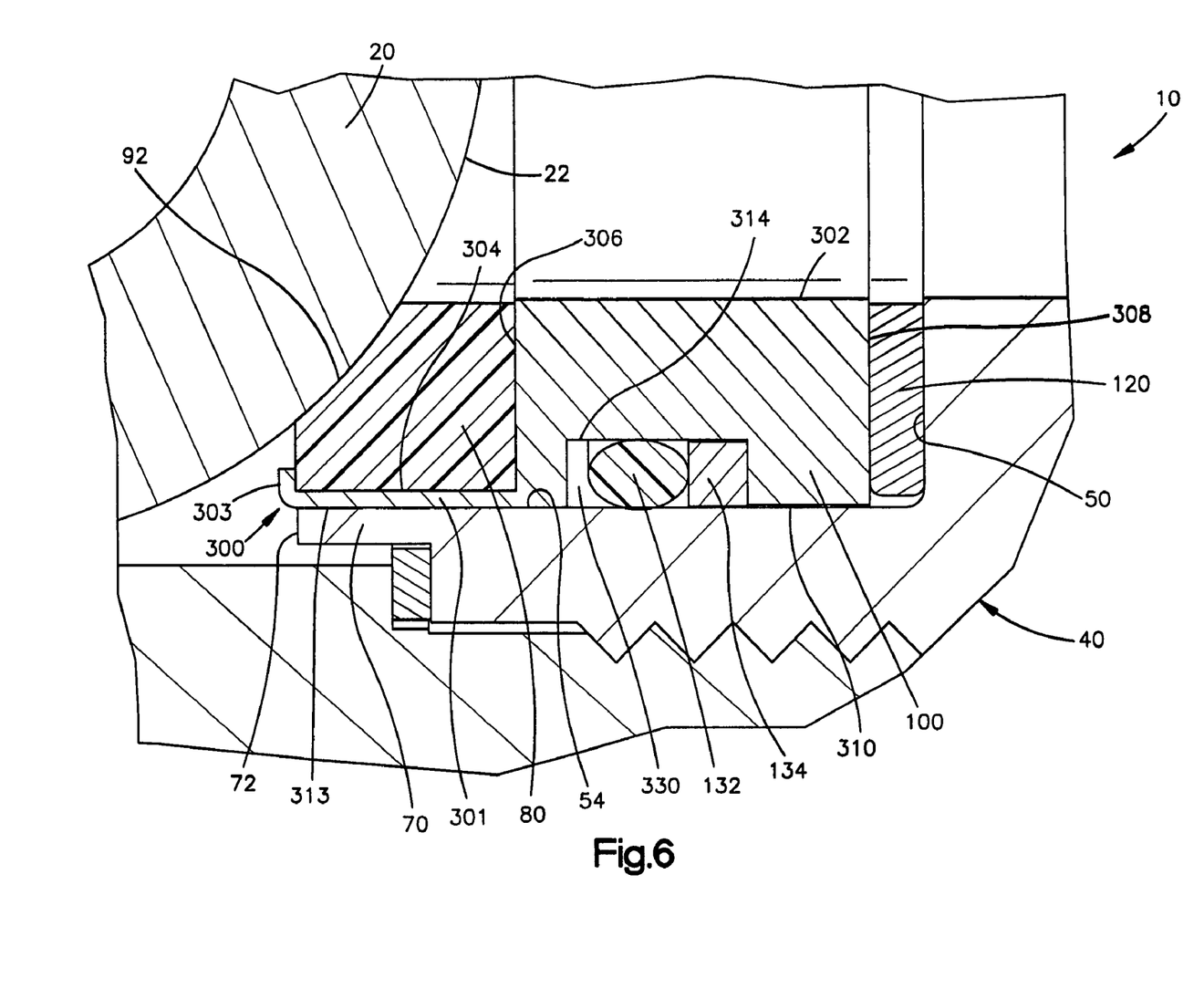
FIG. 6 is a view similar to the view of FIG. 5 showing a ball valve with a gland that includes a seat retaining portion.

FIG. 6 is an enlarged view of a ball valve 10 that is similar to the ball valve illustrated by FIGS. 1-5, but includes a gland 100' with a seat retaining portion 300. The gland 100' is a relatively rigid member that supports the seat 80. The seat retaining portion 300 comprises an axially extending collar 301 with a crimped portion 303 that secures the seat to the gland. In the example of FIG. 6, the portion 303 initially allows the seat 80 to be placed in the collar 301 and is crimped to retain the seat 80 in the collar 301. The collar 301 inhibits radial movement of the seat and the crimped portion 303 inhibits axial movement of the seat 80 relative to the gland 100'.

The gland 100' may be a ring-shaped member having a cylindrical, axially extending inner side surface 302 and a cylindrical, axially extending seat engagement surface 304. The inner side surface 302 defines a central opening through which fluid can flow. The gland 100' also includes parallel, annular, axially outer surface 308 and seat engagement surface 306.

A larger diameter axially outer portion 310 of the gland 100' has a cylindrical outer major surface 312 that is slightly smaller in diameter than the seal surface 54 of the end screw 40. An outer surface 313 of the seat retaining portion 300 is also slightly smaller in diameter than the seal surface of the end screw. An axially central portion 314 of the gland 100' is smaller in diameter than the outer portion 310 and the seal retaining portion 300. The axially central portion 314 defines a seal groove 330.

The spring 120, and the gland 100' with the contained seat 80 are located in the end screw 40. The spring 120 is disposed between the inner end surface 50 of the end screw 40, and the outer end surface 308 of the gland 100'. The spring 120 exerts a biasing force to urge the gland 100' in a direction away from the inner end surface 50 of the end screw 40. The gland 100' presses the seat into engagement with the ball 20. The seal surface 92 of the seat 80 is urged into abutting engagement with the spherical surface 22 of the ball 20.

The seal groove 330 has a rectangular cross-sectional configuration. A seal 132 is disposed in the seal groove 130. In the illustrated embodiment the seal 132 is an O-ring, although other types of seals may be used. The seal 132 is in engagement with the gland 100'. A back up ring 134 is also disposed in the seal groove 330, axially outward of the seal. The back up ring 134 helps to locate the O-ring 132 and to prevent excessive deformation of the O-ring. The seal 132 seals between the inner seal surface 54 of the end screw 40, and the gland 100'.

The seat is sized to prevent any engagement between the gland 100' and the ball 20 in the example of FIG. 6. All the engagement with the ball, and all the sealing effect against the ball, is by the seat 80. As a result, there is no metal to metal contact with the ball 20, which eliminates abrasion, galling or wear of the metal gland and ball.

Other features and advantages of the invention will be apparent to one of ordinary skill in the art.

The invention claimed is:

1. A ball valve comprising:
a valve body;
a cylindrical seal surface in said valve body;
a ball disposed in the valve body;
a spring disposed in the valve body;
a gland surrounded by said cylindrical seal surface, said gland having an outer end surface, a radially outermost surface that extends axially inward from the outer end surface, an axially innermost end surface, a gland seal surface having a diameter that is smaller than a diameter of said radially outermost surface and that extends axially outward from the innermost end surface, and an annular shoulder surface that extends between said radially outermost surface and said gland seal surface, wherein the gland is disposed in the valve body such that the spring applies force to the outer end surface;
a seat having an end surface and a seat seal surface disposed in the valve body such that the force applied by the spring presses the gland against the seat end surface and urges the seat seal surface against the ball;
wherein the gland seal surface of the gland, the annular shoulder surface of the gland, and the end surface of the valve seat together define an annular seal groove; and
a seal member that is separate from said seat disposed in the annular seal groove, wherein the seal member contacts the gland seal surface and the cylindrical seal surface to form a seal against the gland seal surface and the cylindrical seal surface to prevent fluid flow between gland seal surface and the cylindrical seal surface.

2. The ball valve of claim 1 wherein the valve seat is positioned in the valve body such that the valve seat prevents the gland member from contacting the ball.

3. The ball valve of claim 1 wherein cylindrical seal surface is defined in an end screw that is screwed into the valve body.

4. the ball valve of claim 1 wherein the cylindrical seal surface is an interior surface of the valve body.

5. A ball valve comprising:
a valve body;
a ball disposed in the valve body;
a spring disposed in the valve body;
a rigid single piece gland having an outer end surface and an axially innermost end surface having an outer circumferential edge, wherein the gland is disposed in the valve body such that the spring applies force to the outer end surface;
a seat having an end surface and a seal surface disposed in the valve body such that the force applied by the spring presses the outer circumferential edge of the gland against the seat end surface and urges the seal surface against the ball such that the outer circumferential edge of said axially innermost end surface of the gland digs into the end surface of the seat to stabilize the seat.

6. The ball valve of claim 5 wherein the rigid single piece gland is a single metal piece.

7. A ball valve comprising:
a valve body having a valve chamber, an inlet passage, and an outlet passage;
a ball including a flow opening, the ball being mounted in the chamber such that the valve is moveable along an axis defined by the valve chamber and such that that the ball is rotateable in the valve chamber between valve open and closed positions to control fluid flow through the valve;
a valve seat disposed in the valve body having a seal surface in sealing engagement with the ball such that the valve seat is moved along said axis when said ball is moved, wherein the valve seat further comprises a planar end surface that is axially spaced apart from the seal surface;
a rigid single piece gland member having an outer end surface, a cylindrical outer major surface that extends axially inward from the outer end surface, an axially innermost end surface having a circumferential edge, a cylindrical outer minor surface having a diameter that is smaller than a diameter of said cylindrical outer major surface and that extends axially inward from the circumferential edge of the innermost end surface, and an annular shoulder surface that extends between said outer major surface and said outer minor surface, wherein said circumferential edge of said axially innermost end surface is disposed in the valve body such that the outer circumferential edge of said axially innermost end surface of the gland member directly engages a planar end surface of the valve seat and the gland member is moved along said axis when said ball is moved;
an annular disc spring disposed in the valve body in engagement with the gland member such that the disc spring urges the gland member toward the valve seat to urge the valve seat toward the ball.

8. The ball valve of claim 7 wherein the valve seat is positioned in the valve body such that the valve seat prevents the gland member from contacting the ball.

9. The ball valve of claim 7 wherein the gland member and the valve seat define an annular seal groove and the valve further comprises a seal member disposed in the seal groove that seals against the gland member.

10. The ball valve of claim 7 wherein an orientation of the annular disc spring in the valve body is reversible.

11. The ball valve of claim 7 wherein the gland includes a retaining portion that secures the seat to the gland.

12. The ball valve of claim 7 wherein the gland includes a crimped portion that secures the seat to the gland.

13. The ball valve of claim 7 wherein the rigid single piece gland member is a single metal piece.

14. A method of maintaining engagement between a seat and a ball that float in a ball valve housing comprising:
   applying a biasing force to a rigid gland;
   guiding movement of the gland along a travel path defined in the ball valve housing;
   transferring the biasing force from the gland to the seat such that a circumferential edge of the gland is pressed into a planar surface of the such that said circumferential edge of the gland digs into the planar surface of the seat and a portion of the planar surface is spaced apart from the gland;
   guiding movement of the seat along the travel path to maintain engagement between the seat and the ball.

15. The method of claim 14 further comprising positioning the seat in the valve body such that the valve seat prevents the gland member from contacting the ball.

16. A ball valve comprising:
   a valve body;
   a ball disposed in the valve body;
   a spring disposed in the valve body;
   a rigid single piece gland having an outer end surface and an axially innermost end surface having a circumferential edge, wherein the gland is disposed in the valve body such that the spring applies force to the outer end surface;
   a seat having a planar end surface having a portion that is spaced apart from the gland and a seal surface disposed in the valve body such that the force applied by the spring presses the circumferential edge of the gland against the planar end surface of the seat and urges the seal surface against the ball;
   and said circumferential edge digs into said planar end surface of said seat.

17. The ball valve of claim 16 wherein the rigid single piece gland member is a single piece of metal.

18. A ball valve comprising:
   a valve body having a valve chamber, an inlet passage, and an outlet passage;
   a ball including a flow opening, the ball being mounted in the chamber such that the valve is moveable along an axis defined by the valve chamber and such that that the ball is rotateable in the valve chamber between valve open and closed positions to control fluid flow through the valve;
   a valve seat disposed in the valve body in sealing engagement with the ball such that the valve seat is moved along said axis when said ball is moved;
   a rigid single piece gland member having a circumferential edge that engages a planar surface of the valve seat such that the circumferential edge bites into the planar surface of the valve seat;
   an annular disc spring disposed in the valve body in engagement with the gland member such that the disc spring urges the gland member toward the valve seat to urge the valve seat toward the ball.

19. The ball valve of claim 18 wherein the rigid single piece gland member is a single piece of metal.

* * * * *

UNITED STATES PATENT AND TRADEMARK OFFICE
CERTIFICATE OF CORRECTION

PATENT NO. : 7,635,113 B2
APPLICATION NO. : 11/181523
DATED : December 22, 2009
INVENTOR(S) : Bearer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 163 days.

Signed and Sealed this

Ninth Day of November, 2010

David J. Kappos
*Director of the United States Patent and Trademark Office*